United States Patent [19]

Sentivan

[11] Patent Number: 5,020,607
[45] Date of Patent: Jun. 4, 1991

[54] LUG-REMOVING PNEUMATIC IMPACT-GUN AIR BLAST-DEFLECTOR

[76] Inventor: Robert R. Sentivan, 63 King George Rd., Warren, N.J. 07060

[21] Appl. No.: 450,074

[22] Filed: Dec. 13, 1989

[51] Int. Cl.⁵ .............................................. B23B 45/00
[52] U.S. Cl. .............................. 173/171; 173/DIG. 2; 181/264
[58] Field of Search .................. 173/59, 171, 168, 169, 173/DIG. 2; 181/36, 264, 265, 266, 276

[56] References Cited

U.S. PATENT DOCUMENTS

| | | | |
|---|---|---|---|
| 3,712,415 | 1/1973 | Blatt et al. | 181/264 |
| 3,823,795 | 7/1974 | Fleigle | 181/36 |
| 4,751,980 | 6/1988 | De Vane | 181/264 X |

Primary Examiner—Timothy V. Eley
Assistant Examiner—Willmon Fridie, Jr.
Attorney, Agent, or Firm—William T. Hough

[57] ABSTRACT

In a preferred embodiment, a lug-removing pneumatic impact-gun air blast-deflector divertable of forwardly directed exhaust air blast, of which detachably-mountable air-blast deflector structure is mountable on the gun in a position divertable of forward air blast laterally in each of opposite lateral directions, having a vertically extending apertured portion mounted by a forwardly-located horizontally positioned bolt and inclusive of a horizontal rearwardly-extending portion having a distal end portion distally angled rearwardly-upwardly, thereby forming a laterally and upwardly directed air path positioned in front of air-blast exits of the gun.

17 Claims, 4 Drawing Sheets

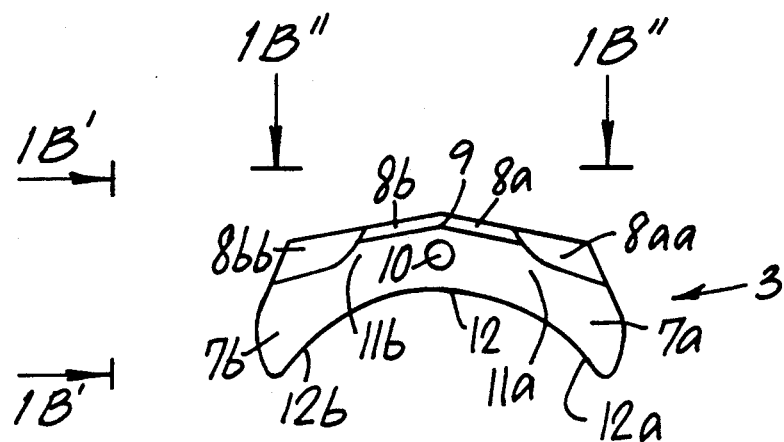
FIG. 1B
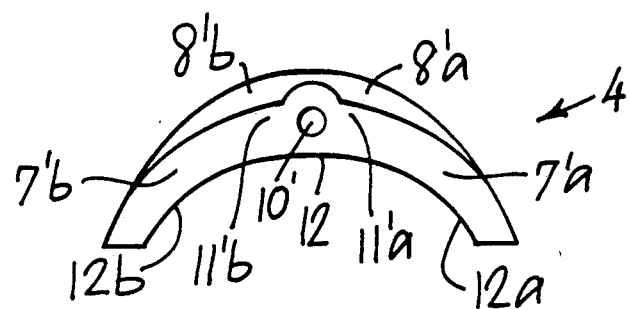
FIG. 2B
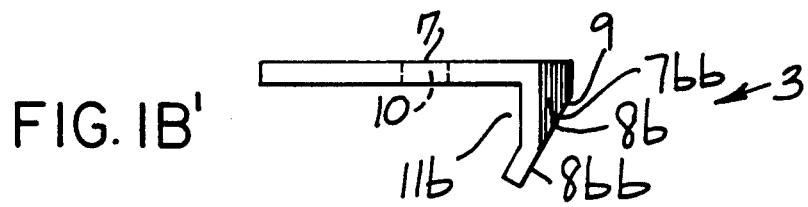
FIG. 1B'
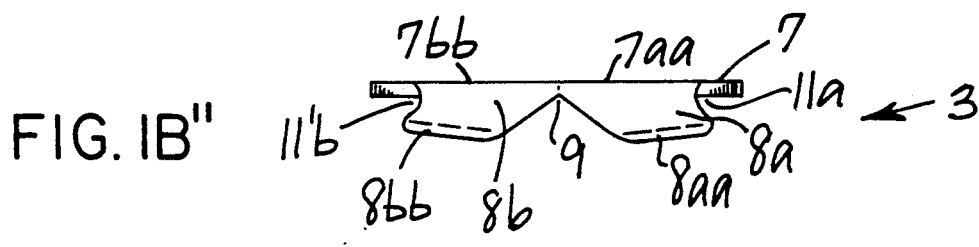
FIG. 1B"

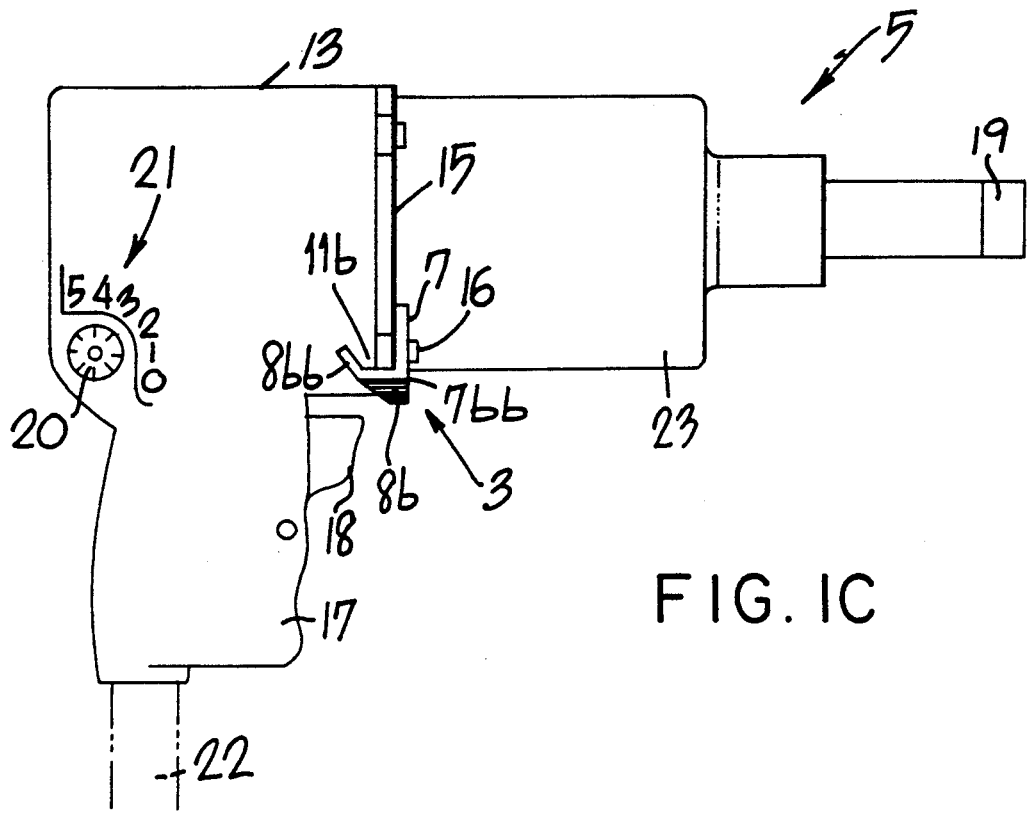
FIG. IC
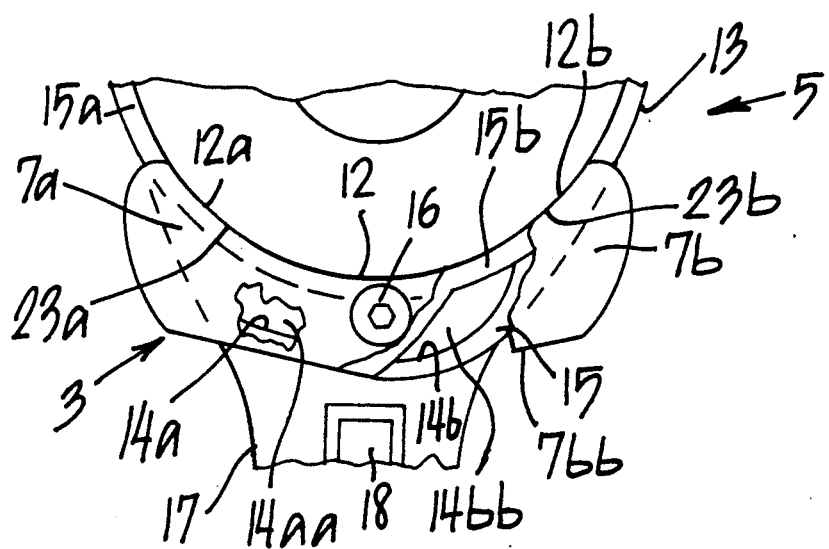
FIG. ID

LUG-REMOVING PNEUMATIC IMPACT-GUN AIR BLAST-DEFLECTOR

This invention is directed to an air-blast deflector for a specific type of lug-removing pneumatic gun having forwardly-directed air-blast air-exhaust ports.

THE PRIOR ART

While there is no known prior art relating to an air-deflector for laterally-directing forward air-blast from a pneumatic gun, the lug-removing pneumatic impact-gun of the type to which the inventive air-deflector is directed, is typically the particular lug-removing Ingersol Rand Air Pneumatic tool models 231 and/or 231-2 each of which are currently manufactured and commercially available at this time, and which have spaced-apart left and right forwardly-directed exhaust-air ports, these model pneumatic tools producing adjustable torque ranging from about 120 to 140 foot-pounds of torque. For the utility to which the present invention is directed, a minimum torque of at-least about 140 foot-pounds is required, at the high no. 5-position setting of those pneumatic tools. The closest prior art patent to the lug-removing pneumatic-gun impact tool of the type to which the present invention is directed, is the Fleigle U.S. Pat. No. 3,823,795 exhibiting in its FIG. 1 a pneumatic gun having forwardly positioned and directed air-blast exhaust ports.

BACKGROUND

The particular air-blast pneumatic impact guns of the typical above-noted types of Ingersol Rand Air Pneumatic tool models 231 and/or 231-2 to which the present invention is specifically directed, is a well-known particular type of lug-removing impact pneumatic gun for which the molds and parts and machining thereof is well established and developed. The design has proven to be well accepted commercially and accordingly continues in present commercial production and is expected to continue into the indefinite future.

However, in the use of the particular lug-removing pneumatic impact guns having the forwardly-directed air blast of the exhausting air thereof, workers in the use thereof to remove lugs from wheels of trucks and/or automobiles and/or other industrial vehicles, have been and continue to be confronted with a serious health hazard to their eye and to their lungs and upper respiratory sinuses and the like, as a direct result of the concentrated and high-intensity forwardly blasting air disrupting asbestos dust and other dirt and debris associated with such wheels and lugs. The asbestos dust and/or dirt and/or debris are air-lifted and impacted into the face and/or eyes and/or nose and/or mouth of the worker removing the wheel lugs by use of the particular lug-removing pneumatic impact gun. As a result of the critical requisite of an exceptionally high-level of impact of at-least about 140 foot-pounds of torque as above-noted for the present invention use in a lug-removing combination of the particular lug-removing pneumatic impact tool, critically the exhaust ports of the gun must remain free of obstructions such as filters, mufflers or the like that inherently would throttle the impact tool power sufficiently to render the tool inoperative for purposes of removing lugs of vehicular wheels—noting that it is not infrequent that such lugs are "frozen" as a result of long use and high temperatures during their use on the wheel(s) such that lesser torque impact pressures (foot pounds of torque) would totally fail to adequately serve required needs for the particular lug-removing pneumatic impact tools to which the present invention is directed. In that sense, the sound-muffler of the above-noted Fleigle U.S. Pat. No. 3,823,795 would critically defeat the utility of the present invention because of inherent back-pressure caused by such device that results in significant and fatal reduction in maximum achievable foot pounds of torque of the particular lug-removing pneumatic impact gun to which the present invention is directed.

It has become recently recognized that continuous exposure to dust and dirt, particularly where such often contains asbestos dust or particles from worn brakes, is potentially carcenogenious and is additionally recognized to constitute a serious threat or potential problem to the sensitive eyes and/or sinus and/or respiratory organs of a worker when blown into the face of the worker attempting to remove the wheel lugs.

THE OBJECTS

The present invention is directed avoiding and/or lessening and/or overcoming such problems.

Another particular object is directed to minimizing the cost or expense to the manufacturer or user of corrective structures for the above-identified particular lug-removing pneumatic impact guns required for the vehicle-wheel lug-removing technology, such that advancement of improved safety and reduction of health hazard will be desirable and readily providable by either or both the manufacturer and/or the consumer because of the simplicity and low cost of the present invention.

Another object is to achieve one or more preceding objects by a novel structure of simple and easy and low-cost manufacture.

Another object is to achieve one or more preceding objects by virtue of a simple and small object easily handled and mountable on lug-removing pneumatic impact guns of the particular types above-discussed, by either or both the manufacturer and/or consuming end-user, such that prolific or wide-spread use thereof will readily reduce health hazards to large segments of the using-public population of workers.

Other objects become apparent from the preceding and following disclosure.

One or more of the objects of this invention are achieved by the invention and disclosed and claimed herein.

BROAD DESCRIPTION OF THE INVENTION

Broadly in the light of the foregoing background and objects, the invention may be characterized as a lug-removing pneumatic impact-gun air blast-deflector for laterally diverting forwardly directed exhaust air blast on the particular lug-removing pneumatic impact guns of the types above-described, having forwardly-directed air-blast exhaust ports, for the particular lug-removing pneumatic impact having forwardly-directed air-blast exhaust or outlet ports. It is noted that for these particular models or types of lug-removing pneumatic impact tool-guns forwardly-directing the air-blast thereof during their use, downward diversion is unacceptable because the high intensity air quickly freezes the finger(s) associated with the trigger of the pneumatic gun, in the small available trigger space. Also, the inventive structure is and must be likewise critically devoid of insert or throttling-down structure(s) in the air outlet or exhaust ports that would materially or significantly block the exhaust port(s) and/or that would interfere with use of the trigger and/or constitute structure on which the hand or finger could be struck or injured and/or which would get in the way of handling or moving-about the tool within limited working space. It is in the light of foregoing background problems together with these considerations that add to the critical nature of the present invention and its structural shape together with its susceptability to easy mounting onto and detachability from the particular above-described lug-removing pneumatic impact gun. Accordingly the present inventive air-blast deflector includes an air-blast deflector structure and mechanism thereof that is mountable on the particular impact lug-removing pneumatic gun which gun is structured to blast exhaust air forwardly. The air-blast deflector structure and mechanism thereof is/are formed, manufactured and/or shaped such that it is mountable on the particular lug-removing pneumatic impact gun in a position adapted to intercept forwardly-blasted exhaust air and to redirect the forwardly-blasted exhaust air to at-least one lateral direction, noting that the air blast deflector of this invention does not detrimentally cause any significant air back-pressure to any extent that detrimentally interferes with or reduces the essential minimum number of foot pounds of torque pounds. Thereby and accordingly, forwardly-directed exhaust air blast from the particular lug-removing pneumatic impact gun is prevented from blasting forwardly-located debris. The air-blast deflector structure and mechanism thereof is/are easily detachably mountable onto the particular lug-removing pneumatic impact gun.

In a preferred embodiment, the above-described invention further includes the particular lug-removing pneumatic impact gun having the inventive air-blast deflector structure and mechanism thereof mounted thereon, as a novel combination.

In another preferred embodiment, the invention includes the air-blast deflector structure and mechanism thereof including a substantially vertically positionable flange having a lower forward edge adapted to be mounted by a housing-bolt of the particular lug-removing pneumatic impact gun positioned to exhaust its air blast substantially vertically forwardly, and also includes a deflector baffle extending horizontally rearwardly from and integral with a lower forward edge when the flange is vertically positioned and mounted on the particular lug-removing pneumatic impact gun. As a result of such inclusions, the flange extends substantially along a transverse plane relative to a longitudinal axis of a forwardly-directed air blast outlet of the lug-removing pneumatic impact gun whereby at least one unobstructed substantially laterally-extending air flow path is formed along which forwardly directed air-blast is laterally divertable when exhausting from the particular lug-removing pneumatic impact gun. In this embodiment, more preferably the vertically positionable flange includes aperture-forming structure forming a through-space aperture of a size and positioned to receive a forwardly-positioned housing bolt of the particular lug-removing pneumatic impact gun produceable of a forwardly-directed air-blast. Also in this embodiment, more preferably the deflector structure and mechanism thereof further includes oppositely-extending first and second first and second portions extending in substantially opposite lateral directions; each of the first and second portions include substantially a laterally-extending half of each of the vertically positionable flange and the downwardly-positioned substantially horizontally rearwardly-extending deflector baffle whereby at-least two oppositely-extending unobstructed substantially laterally-extending air flow paths are formed along which forwardly directed air-blast is divertable for exhausting from the particular lug-removing pneumatic impact gun. Also in this embodiment, the deflector baffle preferably includes oppositely-extending left and right deflectors on each of opposite sides of a centerline location, each deflector including a proximal portion located in juxtaposition to the centerline location and a distal portion angled obliquely upwardly and rearwardly at about a 25 to 55 degree angle, typically at about 40 degrees. Also, this embodiment preferably includes the particular lug-removing pneumatic impact gun having said air-blast deflector mounted thereon, as a novel combination. Optionally or in addition, the invention includes the deflector structure and mechanism thereof including at least one deformable plate bent along said forward edge to form and position each of the above-noted vertically positionable flange and the above-noted horizontally rearwardly-extending deflector baffle. More preferably the vertically positionable flange includes aperture-forming structure forming a through-space aperture of a size and positioned to receive a forwardly-positioned housing bolt of a pneumatic gun produceable of a forwardly-directed air-blast; optionally and preferably, another preferred embodiment of the invention includes the particular lug-removing pneumatic impact gun having its air-blast deflector thereby mounted thereon as a novel combination.

In an alternate embodiment, the deflector structure and mechanism thereof includes a single unitary plate of predetermined thickness. A rearward partially machined-away upper portion of a secondary thickness less than the predetermined thickness as said vertical positionable flange, and also includes therebelow a residual residual-portion) retaining substantially its full-thickness [substantially equal to (substantially the same as) the predetermined thickness as the forwardly-positioned substantially horizontally rearwardly-extending deflector baffle. More preferably, the vertically positionable flange includes aperture-forming structure forming a through-space aperture of a size and positioned to receive a forwardly-positioned housing bolt of a pneumatic gun produceable of a forwardly-directed air-blast. In another preferred embodiment, there is included the particular lug-removing pneumatic impact gun having the air-blast deflector mounted thereon as a novel combination.

THE FIGURES

FIG. 1A diagrammatically illustrates one preferred embodiment of the inventive deflector structure and mechanism thereof, shown in an inverted position, as a front view thereof with regard to the position thereof when mounted on the particular lug-removing pneumatic impact gun above-described.

FIG. 1AA diagrammatically illustrates the same embodiment and inverted front view as that of FIG. 1, except that in this illustration, the deflector structure and mechanism thereof is shown prior to the bending of the deflector baffle to its horizontally rearwardly extending position relative to the vertical positionable flange carrying the bolt-mounting hole.

FIG. 1B diagrammatically illustrates an inverted back view of the same embodiment as that of FIG. 1.

FIG. 1B' diagrammatically illustrates a right-side view as taken along lines 1B'—1B' of FIG. 1B, the deflector structure and mechanism thereof here being shown tilted-over 90 degree, not being in an actual mounting upright-position as it would be viewed from the right side of the gun when mounted on the particular lug-removing pneumatic impact gun above-described, as shown is below described FIG. 1C.

FIG. 1B" diagrammatically illustrates a bottom inverted view as taken along lines 1B"–1B" of FIG. 1B, this illustrated bottom-viewed position not being the upright actual position as it would be viewed from the front view when uprightly mounted on the particular lug-removing pneumatic impact gun above-described as shown in the below described FIG. 1D.

FIG. 1C diagrammatically illustrates a side view of the novel gun-combination of the novel air-blast deflector structure and mechanism thereof of FIGS. 1A, 1AA, 1B, 1B', and 1B" in a mounted-position in the side-viewed position as contrasted to the illustrated 90 degree tilted-over view in above-described FIG. 1B'.

FIG. 1D diagrammatically illustrates a front view of the deflector structure and mechanism thereof of above-described FIGS. 1A, 1AA, 1B, 1B', 1B" and 1C, in a mounted position illustrated in above-described FIG. 1C illustrating the same front view as FIG. 1A for the deflector structure and its mechanism.

FIG. 2A diagrammatically illustrates an alternate preferred embodiment of the inventive deflector structure and mechanism thereof, shown in an inverted position, as a front view thereof with regard to the position thereof when mounted on the particular lug-removing pneumatic impact gun above-described.

FIG. 2B diagrammatically illustrates an inverted back view of the same embodiment as that of FIG. 1.

FIG. 2C diagrammatically illustrates a side view of the novel gun-combination of the novel air-blast deflector structure and mechanism thereof of FIGS. 2A, and 2B, in a mounted-position in the side-viewed position.

FIG. 2D diagrammatically illustrates a front view of the deflector structure and mechanism thereof of above-described FIGS. 2A, 2B and 2C, in a mounted position illustrated in above-described FIG. 2C illustrating the same front view as FIG. 2A for the deflector structure and its mechanism.

DETAILED DESCRIPTION

Figure 1A:
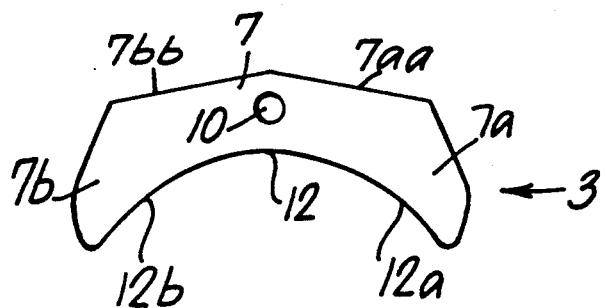

FIGS. 1A, 1AA, 1B, 1B', 1B'", 1C and 1D are each and all directed to different view-illustrations of the same common embodiment. Accordingly, to the extent that these different Figures illustrate common elements, the indicia are identical.

FIGS. 2A, 2B, 2C and 2D are each and all directed to an alternate related embodiment illustrating different views of the alternate embodiment. Accordingly, to the extent that the alternate embodiment illustrates substantially corresponding structure of substantially corresponding functions as contrasted to the embodiment of FIGS. 1A and the like, the indicia are related, to facilitate understanding of the similarity in the alternate embodiment. To the extent that elements are the same in different views of this alternate embodiment, indicia of the alternate embodiment in the different illustrations thereof are likewise identical to one another.

Once a particular indicia has been identified as to name and function thereof for either embodiment, description thereafter is not repeated for different view nor for the other embodiment, except in some cases in order to facilitate or improve understanding and an improved ease of following meaning in the description of the invention.

As above noted, the present invention includes in one form thereof, the deflector structure and mechanism thereof considered alone, for use on any particular lug-removing pneumatic impact gun as above-identified. In another form, apart from other preferred and alternate embodiments of the inventive deflector structure and mechanism thereof, another form of the invention is the novel combination inclusive of the particular lug-removing pneumatic impact gun itself as a further novel and inventive combination, achievable of a result not heretofore possible.

The above-described deflector structure and mechanism thereof of this invention is easily installable onto the particular lug-removing pneumatic impact gun above-described, namely typically the Ingersol Rand Air Pneumatic tool currently identified by that company as models 231 and 231-2. Use of the inventive most preferred embodiments of the different alternate embodiments of the invention, allow (cause) the blast of air from the respective left and right exhaust ports thereof to be discharged laterally to the opposite sides of the air pneumatic tool above-noted, instead of being discharged forwardly, i.e. instead of being discharged straight-out toward and against miscellaneous debris previously discussed above. The inventive deflector structure and mechanism thereof can be easily installed on the old models already in the hands of the consuming public, and/or can be installed during manufacture before sale of the resulting novel combination, by mere use of the same forwardly-positioned bolt/screw that for years has been used and is currently still used on this particular lug-removing pneumatic impact-gun air blast-deflector. It is merely required that the forwardly-positioned bolt (screw) as hereinafter identified, be removed, inserted through the through-space screw/bolt aperture of the deflector structure and mechanism thereof, and reinserted within the gun's forward-receiving bolt/screw aperture (receptacle) and a tightening thereof, with the resulting mounting of the novel inventive defector structure and mechanism of the present invention, to result in the novel gun-combination thereof.

Accordingly, the invention may be better understood by reference to the following indicia description of elements thereof for the different above-noted Figures.

In FIG. 1A, there is shown in an inverted state, the embodiment 3 having the vertically positionable flange 7 as left and right flanges 7a and 7b (left and right, as they would be positioned and mounted on the above-described, particular, lug-removing pneumatic impact gun), the bottom right and left edges 7aa and 7bb, the left and right top edges 12a and 12b, and the bolt-receiving through-space hole 10 formed in the vertically positionable flange intermediate between the left and right flanges 7a and 7b.

FIG. 1AA illustrates the same embodiment 3 structure and features as that of FIG. 1A, also illustrated in the inverted position relative to its normal mounting position, except here illustrating a view as it would appear prior to the final bending and/or forming and/or molding in the final-shaped state as bent or formed or molded with a 90-degree bend along the above-described lower edges (lower edges when positioned for or after mounting on the particular above-described gun) 7aa and 7bb between the vertically positionable flanges 7a and 7b and the horizontally-rearwardly positionable deflector baffles-proximal portions 8a and 8b. Also shown are the rearwardly upwardly angularly positionable right and left deflector baffles-distal portions 8aa and 8bb angled obliquely upwardly and rearwardly as positioned when mounted on the particular above-described gun. Also shown, is the recessed or slotted-structure between the lower edges 7aa and 7bb, allowing the forward edges 7aa and 7bb to be slightly angled upwardly (as described relative to the position when mounted on the particular above-described gun) along sideward portions thereof, when bent along the illustrated dotted-line representing the locations of the forward edges 7aa and 7bb.

FIG. 1B in its back view of the same embodiment 3 shows the same elements above-described for FIG. 1AA, except additionally showing the positions of the respective oppositely laterally-extending left and right diverted air-blast channels 11a and 11b as they would be located when the embodiment 3 is mounted on the particular air gun as illustrated in respective FIGS. 1C and 1D.

FIG. 1B' illustrates for the embodiment 3 the same elements and features as described for preceding Figures of the embodiment 3, except better illustrating the right upwardly angle sidewardly-extending bottom distal portion 8b relative to the more downwardly-positioned centerline location of the indented or slot location 9 in the mounted position typically shown in FIG. 1C.

FIG. 1B" illustrates for the embodiment 3 the same elements above-described, except better illustrating the relative locations of the respective above-described elements to one another in this bottom view as it would be viewed in the mounted state and position as typically shown in FIG. 1C.

FIG. 1C illustrates the novel gun-combination 5 in a right-side view of the combination, in addition to elements previously described, better showing their relationships to the particular above-described gun. Additionally, the otherwise conventional and currently commercially available above-described particular lug-removing pneumatic impact gun 13 is illustrated as to conventional parts/elements thereof such as the lug-engaging element 19 and the forward plate 15 mounted by the forward bolts/screws inclusive of the lower forward bolt/screw 16, the handle 17, the gun-actuation trigger 18, the torque-impact adjustment adjustable switch 20 for adjusting between low and high impact positions 21 ranging from zero-impact position to the highest torque impact position 5, illustrating typical positions ranging from zero up to position 5 often and normally present, noting that for lug-removing purposes it is normally necessary and critical to have the gun set at the maximum torque position number 5. Also shown is forwardly-positioned gun portion 23. Also shown in phantom dotted lines is the typical prior art pneumatic air-providing line 22 as it would be positioned and mounted to the gun.

FIG. 1D illustrates the same elements as previously described, except additionally showing in the cut-aways the forwardly-directed right and left gun blast-air exhaust vents 14aa and 14bb, as well as showing corresponding left-side elements described only for right-side elements in FIG. 1C, such as right and left portions 15a and 15b of the front plate (edge) 15, and the right and left bottom portions 23a and 23b of the forwardly-extending gun portion 23 of FIG. 1C.

Figure 2A:
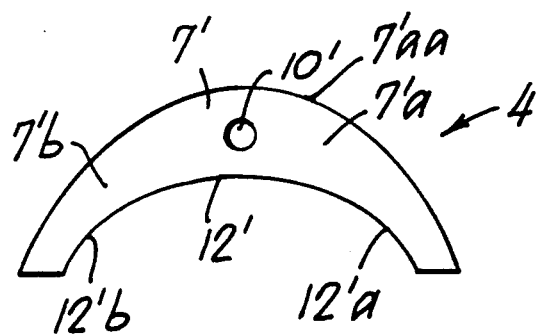
Figure 1A:
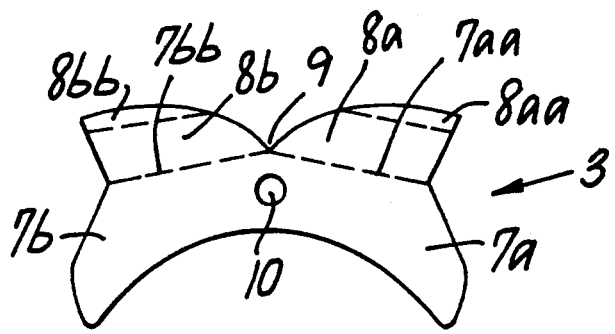

FIG. 2A there is shown in an inverted state, the embodiment 4 having the vertically positionable flange 7' as left and flanges 7'a and 7'b (left and right, as they would be positioned and mounted on the above-described particular lug-removing pneumatic impact gun), the bottom right and left edges 7'aa and 7'bb, the left and right top edges 12'a and 12'b, and the bolt-receiving through-space hole 10' formed in the vertically positionable flange intermediate between the left and right flanges 7'a and 7'b.

Figure 2C:
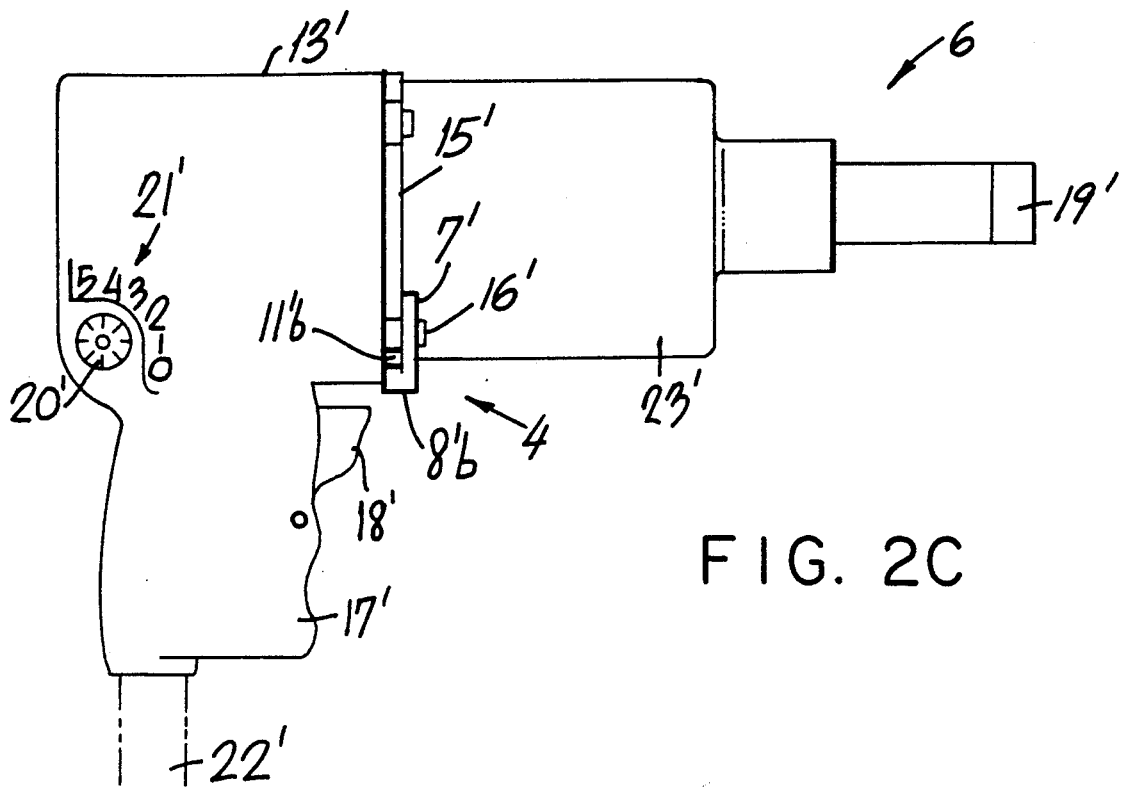
Figure 2D:
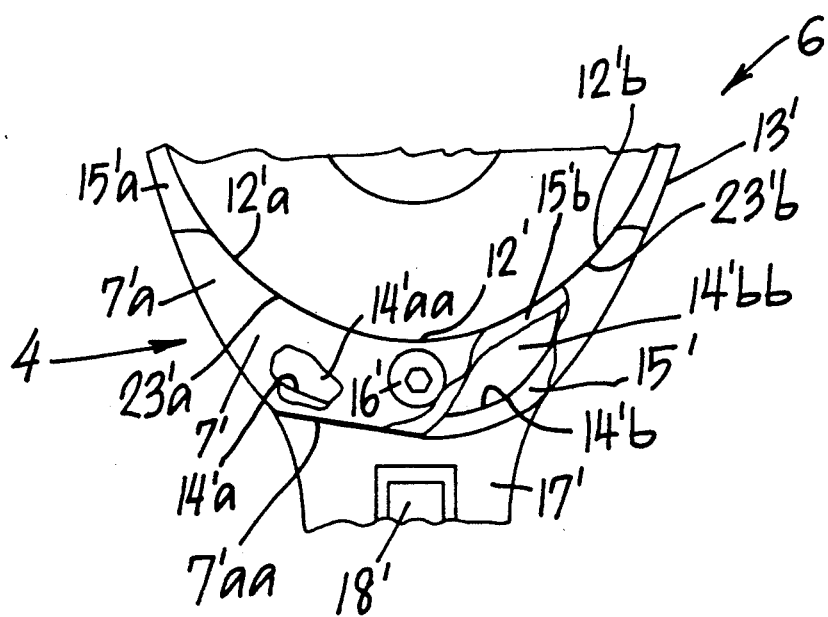

FIG. 2B in its back view of the same embodiment 4 shows the elements corresponding to those described in above-described for FIG. 1AA and to some extent in FIGS. 2A and 1A, including the machined portions 7'a and 7'b that have the secondary remaining lesser thickness as compared to the above-described predetermined thickness retained by the unground (unmachined) portions 8'a and 8'b, and the thereby formed positions of the respective oppositely laterally-extending left and right diverted air-blast channels 11'a and 11'b as they would be located when the embodiment 4 is mounted on the particular air gun 13' as illustrated in respective FIGS. 2C and 2D.

FIG. 2C illustrates the novel gun-combination 6 in a right-side view of the combination, in addition to elements previously described, better showing their relationships to the particular above-described gun. Additionally, the otherwise conventional and currently commercially available above-described particular lug-removing pneumatic impact gun 13', the elements thereof corresponding to elements described-above for gun 13 of the gun-combination 5 of FIG. 1C as to the conventional parts/elements thereof.

FIG. 2D illustrates for the embodiment 4 the same elements as previously described, except additionally showing in the cut-aways corresponding to those described for embodiment 3 of FIG. 1D, here for the embodiment 4 showing the forwardly-directed right and left gun blast-air exhaust vents 14'aa and 14'bb, as well as showing corresponding left-side elements described only for right-side elements in FIG. 2C, such as right and left portions 15'a and 15'b of the front plate (edge) 15', and the right and left bottom portions 23'a and 23'b of the forwardly-extending gun portion 23' of FIG. 2C.

As should apparent from the preceeding disclosure and descriptions thereof, to mount the vertically positionable flanges 7 or 7' through the bolt or screw-receiving apertured hole 10 or 10' thereof, the bolt or screw 16 or 16' is simply removed from it position of mounting the plate 15 or 15', the aperture-hole 10 or 10' is merely matched with the correspondingly positioned bolt or screw-receiving hole (not shown) in the plate 15 with the deflector vertically positionable flanges 7 or 7' extending upwardly against the gun forwardly-extending portions 23a and 23b or 23'a and 23'b, and thereafter inserting the bolt or screw 16 or 16' through the hole 10 or 10' and tightening the bolt or screw to tightly secure the plate 15 or 15' and the mounted above-described blast deflector of this invention, as typically shown in the novel mounted combinations of FIGS. 1C and 1D and 2C and 2D.

It is within the scope of the invention to make such variations and substitution of equivalents and modifications as would be apparent to a person of ordinary skill in this particular art.

I claim:

1. An impact lug-removing pneumatic impact-gun air blast-deflector adapted to divert forwardly directed air-exhaust blast from at-lest one forwardly-directed air exhaust port of an impact lug-removing pneumatic gun produceable of an impact for impact lug-removing, comprising: an air-blast deflector means (a) for mounting on the impact lug-removing pneumatic gun structured to blast exhaust air forwardly from the air exhaust port, (b) for mounting on the impact lug-removing pneumatic gun in a position adapted (1) to intercept the forwardly-directed air-exhaust blast and (2) to redirect intercepted forwardly-directed air-exhaust blast to at-least one lateral direction while concurrently limiting back pressure sufficiently that the torque is reduced to not less than a minimum of at-lest about 140 foot-pounds, and (c) for preventing the forwardly-directed air-exhaust blast from the impact lug-removing pneumatic gun from blasting forwardly-located debris, said air-blast deflector means being detachably mountable onto said impact lug-removing pneumatic gun, such that when the air-blast deflector means is mounted on the said impact lug-removing pneumatic gun, forwardly-directed air from the air exhaust port is intercepted, blocked and directed laterally.

2. An impact lug-removing pneumatic impact-gun for laterally diverting forwardly directed air-exhaust blast from at-least one forwardly-directed air exhaust port of an impact lug-removing pneumatic gun produceable of an impact for impact lug-removing, comprising in combination: an impact lug-removing pneumatic gun structured to blast exhaust air from at-least one forwardly-positioned air exhaust outlet port, said air-blast deflector means mountable on the impact lug-removing pneumatic gun, said air-blast deflector means being mounted on said impact lug-removing pneumatic impact-gun in a position adapted to intercept forwardly-blasted exhaust air from each said air exhaust outlet port and to redirect the forwardly-blasted exhaust air away from a forward direction such that air-exhaust blast from each impact lug-removing pneumatic gun exhaust port is prevented from blasting forwardly-located debris while concurrently limiting back pressure sufficiently that the torque is reduced to not less than a minimum of at-least about 140 foot-pounds.

3. An impact lug-removing pneumatic impact-gun air blast-deflector of claim 1, including the impact lug-removing pneumatic gun with said air-blast deflector means mounted thereon.

4. An impact lug-removing pneumatic impact-gun air blast-deflector of claim 1, in which said air-blast deflector means includes a proximal portion having aperture-forming structure forming a through-space bolt-receiving hole, and at-least one distal portion angled obliquely upwardly and rearwardly when the air-blast deflector means is mounted on the impact lug-removing pneumatic gun.

5. An impact lug-removing pneumatic impact-gun air blast-deflector of claim 4, including the impact lug-removing pneumatic gun with said air-blast deflector means mounted thereon.

6. An impact lug-removing pneumatic impact-gun air blast-deflector adapted to divert forwardly directed air-exhaust blast from at-least one forwardly-directed air exhaust port of an impact lug-removing pneumatic gun produceable of an impact for impact lug-removing, comprising: an air-blast deflector means (a) for mounting on the impact lug-removing pneumatic gun structured to blast exhaust air forwardly from the air exhaust port, (b) for mounting on the impact lug-removing pneumatic gun in a position adapted (1) to intercept the forwardly-directed air-exhaust blast and (2) to redirect intercepted forwardly-directed air-exhaust blast to at-least one lateral direction while concurrently limiting back pressure sufficiently that the torque is reduced to not less than a minimum of at-least about 140 foot-pounds, and (c) for preventing the forwardly-directed air-exhaust blast from the impact lug-removing pneumatic gun from blasting forwardly-located debris, said air-blast deflector means being detachably mountable onto said impact lug-removing pneumatic gun, such that when the air-blast deflector means is mounted on the said impact lug-removing pneumatic gun, forwardly-directed air from the air exhaust port is intercepted, blocked and directed laterally, said air-blast deflector means including a flange means for being positioned substantially vertically relative to the pneumatic gun positioned uprightly with its exhaust port structure substantially horizontally positioned such that direct exhaust air is directed forwardly, said flange means having a lower forward edge adapted to be mounted by a housing-bolt of the impact lug-removing pneumatic gun, and in which said air-blast deflector means further includes a deflector baffle extending horizontally rearwardly from and integral with a lower forward edge when the flange means is vertically positioned and mounted on the impact lug-removing pneumatic gun, such that the flange means when vertically mounted extends substantially along a transverse plane relative to a longitudinal axis of said forwardly-directed air-exhaust blast from said forwardly-directed air exhaust port of the pneumatic gun whereby at least one unobstructed substantially laterally-extending air flow path is formed along which the forwardly directed air-blast is laterally divertable when exhausting from the forwardly-directed air exhaust port.

7. An impact lug-removing pneumatic impact-gun air blast-deflector of claim 6, in which said flange means includes aperture-forming structure forming a through-space aperture of a size adapted and positioned to receive a forwardly-positioned housing bolt of the impact lug-removing pneumatic gun.

8. A lug-removing pneumatic impact-gun air blast-deflector of claim 6, in which said deflector baffle includes oppositely-extending left and right deflectors on each of opposite sides of a centerline location, each deflector including a proximal portion located in juxta-position to the centerline location and a distal portion angled obliquely upwardly and rearwardly.

9. An impact lug-removing pneumatic impact-gun air blast-deflector of claim 6, including said impact lug-removing pneumatic gun with said air-blast deflector means mounted thereon.

10. An impact lug-removing pneumatic impact-gun air blast-deflector of claim 6, in which said air-blast deflector means includes at least one deformable plate bent along said forward edge to form and position each of said flange means and said horizontally rearwardly-extending deflectyor baffle.

11. An impact lug-removing pneumatic impact-gun air blast-deflector of claim 10, in which said flange means includes aperture-forming structure forming a through-space aperture of a size and positioned to receive a forwardly-positioned housing bolt of the impact lug-removing pneumatic gun.

12. An impact lug-removing pneumatic impact-gun air blast-deflector of claim 11, including the impact lug-removing pneumatic gun with said air-blast deflector means mounted thereon.

13. An impact lug-removing pneumatic impact-gun air blast-deflector of claim 6, in which said flange means and said rearwardly-extending deflector baffle are a single unitary plate, said flange means being of a first predetermined thickness, said rearwardly-extending deflector baffle being of a second predetermined thickness, said second predetermined thickness being less than said first predetermined thickness.

14. An impact lug-removing pneumatic impact-gun air blast-deflector of claim 13, in which said flange means includes aperture-forming structure forming a through-space aperture of a size and positioned to receive a forwardly-positioned housing bolt of the impact lug-removing pneumatic gun.

15. An impact lug-removing pneumatic impact-gun air blast-deflector of claim 14, including the impact lug-removing pneumatic gun with said air-blast deflector means mounted thereon.

16. An impact lug-removing pneumatic impact-gun air blast-deflector of claim 6, in which said air-blast deflector means includes oppositely-extending first and second portions extending in substantially opposite lateral directions, each of said first and second portions including substantially a laterally-extending half of each of said flange means and said downwardly-positioned substantially horizontally rearwardly-extending deflector baffle whereby at-least two oppositely-extending unobstructed substantially laterally-extending air flow paths are formed along which said forwardly directed air-blast is divertable for forwardly exhausting air from the impact lug-removing pneumatic gun.

17. An impact lug-removing pneumatic impact-gun of claim 2, in which said air-blast deflector means is detachably mounted onto said impact lug-removing pneumatic gun.

* * * * *